United States Patent
Fukuda

(10) Patent No.: US 9,785,872 B2
(45) Date of Patent: Oct. 10, 2017

(54) IMAGE PROCESSING APPARATUS THAT REDUCES TIME REQUIRED FOR PRINTING PROCESS, CONTROL METHOD FOR THE IMAGE PROCESSING APPARATUS, PRINTING SYSTEM, CONTROL METHOD FOR THE PRINTING SYSTEM, AND STORAGE MEDIUM

(71) Applicant: CANON KABUSHIKI KAISHA, Tokyo (JP)

(72) Inventor: Shin Fukuda, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/193,245

(22) Filed: Jun. 27, 2016

(65) Prior Publication Data
US 2017/0011283 A1    Jan. 12, 2017

(30) Foreign Application Priority Data
Jul. 6, 2015    (JP) ................................ 2015-135279

(51) Int. Cl.
G06K 15/02 (2006.01)
H04N 1/00 (2006.01)
H04N 1/21 (2006.01)
G06F 3/12 (2006.01)

(52) U.S. Cl.
CPC ......... *G06K 15/184* (2013.01); *G06F 3/1215* (2013.01); *G06F 3/1248* (2013.01); *G06F 3/1293* (2013.01); *G06F 3/1298* (2013.01); *G06K 15/1823* (2013.01); *G06K 15/1865* (2013.01); *H04N 1/00204* (2013.01);
(Continued)

(58) Field of Classification Search
None
See application file for complete search history.

(56) References Cited

U.S. PATENT DOCUMENTS

| | | | | |
|---|---|---|---|---|
| 2005/0162694 A1* | 7/2005 | Chiba | .................... | G06K 15/02 358/1.15 |
| 2006/0133678 A1* | 6/2006 | Yokota | .................. | G06F 3/1219 382/239 |

(Continued)

FOREIGN PATENT DOCUMENTS

JP    2015001818 A    1/2015

*Primary Examiner* — Thomas D Lee
(74) *Attorney, Agent, or Firm* — Rossi, Kimms & McDowell LLP

(57) ABSTRACT

An image processing apparatus which prevents a printing process from taking long. The image processing apparatus is connected to a printing apparatus having a storage unit and transfers image data to the printing apparatus. A size of predetermined image data when a speed at which the predetermined image data is stored in the storage unit and a speed at which the predetermined image data stored in the storage unit is printed are the same is obtained as a threshold size. A size of the image data stored in the storage unit in a compressed form is estimated. A compression method for use in compressing the transferred image data is selected from a plurality of compression methods based on the threshold size and the estimated size of the image data. The image processing apparatus notifies the printing apparatus of the determined compression method.

13 Claims, 14 Drawing Sheets

(52) U.S. Cl.
CPC ... *H04N 1/2104* (2013.01); *G06K 2215/0031* (2013.01); *H04N 2201/0094* (2013.01)

(56) References Cited

U.S. PATENT DOCUMENTS

2014/0368862 A1   12/2014  Ooba
2015/0242725 A1*   8/2015  Kurose ................ G06K 15/186
                                                         358/1.2

* cited by examiner

FIG. 5A

MODEL A/80 PPM SPEED MODEL

500

| RECORDING SHEET SIZE (501) | THRESHOLD IMAGE SIZE [MB] (502) |
|---|---|
| B5 | 58 |
| B4 | 114 |
| A4 | 66 |
| A3 | 130 |
| Letter | 68 |
| Legal | 112 |
| ⋮ | ⋮ |

502a points to the A4 / 66 row.

FIG. 5B

MODEL B/70 PPM SPEED MODEL

550

| RECORDING SHEET SIZE (501) | THRESHOLD IMAGE SIZE [MB] (502) |
|---|---|
| B5 | 70 |
| B4 | 136 |
| A4 | 80 |
| A3 | 160 |
| Letter | 82 |
| Legal | 135 |
| ⋮ | ⋮ |

FIG. 10A

MODEL A/80 PPM SPEED MODEL

| RECORDING SHEET SIZE | THRESHOLD IMAGE SIZE [MB] |
|---|---|
| B5 | 70 |
| B4 | 120 |
| A4 | 70 |
| A3 | 120 |
| Letter | 70 |
| Legal | 120 |
| ⋮ | ⋮ |

FIG. 10B

MODEL B/70 PPM SPEED MODEL

| RECORDING SHEET SIZE | THRESHOLD IMAGE SIZE [MB] |
|---|---|
| B5 | 40 |
| B4 | 100 |
| A4 | 50 |
| A3 | 100 |
| Letter | 50 |
| Legal | 100 |
| ⋮ | ⋮ | even# IMAGE PROCESSING APPARATUS THAT REDUCES TIME REQUIRED FOR PRINTING PROCESS, CONTROL METHOD FOR THE IMAGE PROCESSING APPARATUS, PRINTING SYSTEM, CONTROL METHOD FOR THE PRINTING SYSTEM, AND STORAGE MEDIUM

BACKGROUND OF THE INVENTION

Field of the Invention

The present invention relates to an image processing apparatus, a control method for the image processing apparatus, a printing system, a control method for the printing system, and a storage medium.

Description of the Related Art

Conventionally, there is known an image processing system in which a DFE (digital front end controller), which is an image processing apparatus, and a host computer, which is an information processing apparatus, are connected together via a network, and a printing apparatus is connected to the DFE (see, for example, Japanese Laid-Open Patent Publication (Kokai) No. 2015-1818). The DFE receives a print job from the host computer. The print job includes PDL (page description language) data which is print data, and the DFE subjects the PDL data to a RIP (raster image processor) process to generate BMP (bitmap image data). The DFE transfers the generated BMP to the printing apparatus, which in turn subjects the transferred BMP to a compression process and temporarily stores it in, for example, a RAM which the printing apparatus has. After that, the printing apparatus stores the BMP, which has been stored in the RAM, in an HDD which the printing apparatus has. The BMP stored in the HDD is printed when, for example, a user instructs the DFE or the printing apparatus to perform printing of the BMP stored in the HDD.

Lately, there is known a printing apparatus which prints BMP, which is stored in an HDD, at high speed (hereafter referred to as "the high-speed printing apparatus"). A DFE is usually able to generate multiple pieces of BMP within a short time period and transfer them to the high-speed printing apparatus, and upon receiving multiple pieces of BMP within a short time period, the high-speed printing apparatus successively prints the received multiple pieces of BMP.

However, when a large amount of BMP is transferred from the DFE to the high-speed printing apparatus, it may take long to store the transferred large amount of BMP in the HDD. Namely, the writing speed at which the BMP is stored in the HDD may be lower than the printing speed at which the BMP is printed, and as a result, the high-speed printing apparatus may stand by until BMP planned to be printed is stored in the HDD. This presents a problem because a printing process takes long.

Moreover, there may be a case where the capacity of a RAM which the high-speed printing apparatus has is small, and hence BMP that has been transferred from the DFE and subjected to a compression process cannot be stored in the RAM. In this case, the high-speed printing apparatus requests the DFE to transfer the BMP again, subjects the BMP transferred again to another compression process, and stores it in the RAM. This presents a problem because it takes long for the high-speed printing apparatus to compress BMP transferred from the DFE and store the compressed BMP in the RAM, and as a result, a printing process takes long.

SUMMARY OF THE INVENTION

The present invention provides an image processing apparatus which prevents a printing process from taking long, a control method for the image processing apparatus, a printing system, a control method for the printing system, and a storage medium.

Accordingly, the present invention provides an image processing apparatus that is connected to a printing apparatus having a storage unit and transfers image data to the printing apparatus, comprising an obtaining unit configured to obtain, as a threshold size, a size of predetermined image data when a speed at which the predetermined image data is stored in the storage unit and a speed at which the predetermined image data stored in the storage unit is printed are the same, an estimation unit configured to estimate a size of the image data stored in the storage unit in a compressed form, a determination unit configured to, from a plurality of compression methods, select a compression method for use in compressing the transferred image data based on the threshold size and the estimated size of the image data, and a notification unit configured to notify the printing apparatus of the determined compression method.

According to the present invention, a printing process is prevented from taking long.

Further features of the present invention will become apparent from the following description of exemplary embodiments (with reference to the attached drawings).

BRIEF DESCRIPTION OF THE DRAWINGS

FIGS. 5A and 5B are diagrams useful in explaining threshold lists stored in an HDD of the DFE in FIG. 1.

FIGS. 10A and 10B are diagrams useful in explaining memory size lists showing memory sizes required to store the BMP in FIG. 2 in a RAM.

DESCRIPTION OF THE EMBODIMENTS

Hereafter, a first embodiment of the present invention will be described in detail with reference to the drawings.

Figure 1:
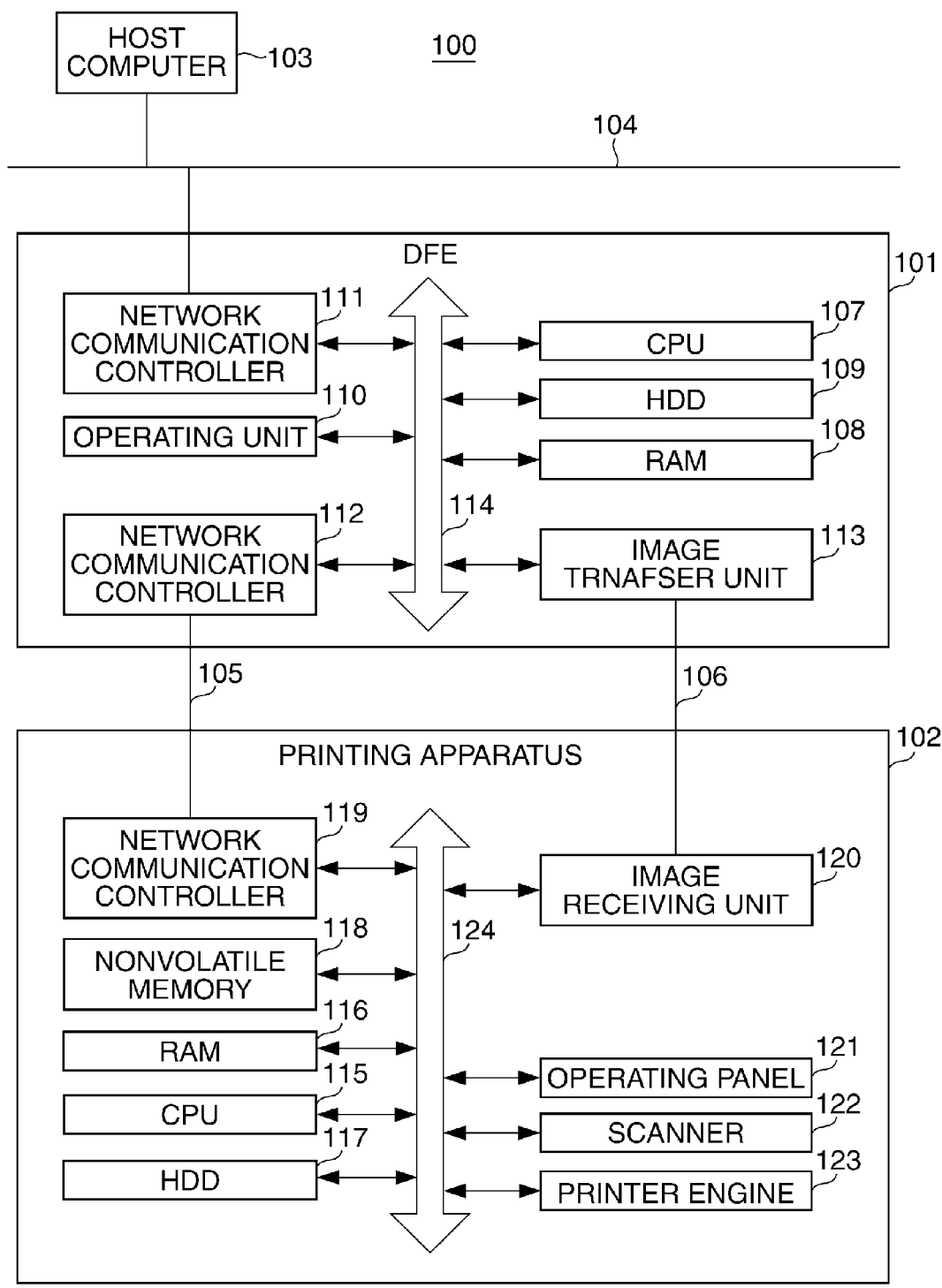
FIG. 1 is a block diagram schematically showing internal arrangements of a DFE and an MFP which are an image processing apparatus and a printing apparatus, respectively, and constitute a printing system according to a first embodiment of the present invention.

FIG. 1 is a block diagram schematically showing internal arrangements of a DFE 101 and an MFP 102 which are an image processing apparatus and a printing apparatus, respectively, and constitute a printing system 100 according to the first embodiment of the present invention.

The printing system 100 in FIG. 1 has the DFE 101, the MFP 102, and a host computer 103. The DFE 101 and the host computer 103 are connected together via a communication network 104, and the DFE 101 and the MFP 102 are connected together via a local network line 105 and an image data transfer line 106.

The DFE 101 has a CPU 107 (an obtaining unit, an estimation unit, a determination unit, a notification unit, a predicting unit), a RAM 108, an HDD 109, an operating unit 110, network communication controllers 111 and 112, and an image transfer unit 113. The component elements of the DFE 101 are connected to one another via a system bus 114. The MFP 102 has a CPU 115, a RAM 116 (a first storage unit), an HDD 117 (a second storage unit), a nonvolatile memory 118, a network communication controller 119, an image receiving unit 120, an operating panel 121, a scanner 122, and a printer engine 123. The component elements of the MFP 102 are connected to one another via a system bus 124.

In the DFE 101, the CPU 107, for example, executes a variety of programs stored in the HDD 109 to control image data and component elements of the DFE 101. The RAM 108 is a work memory for the CPU 107 and stores computation data on the CPU 107 and a variety of programs. The HDD 109 stores image data such as BMP 204, to be described later, and a large volume of data such as a variety of setting data. The HDD 109 also stores threshold lists 500 and 550 and memory size lists 1000 and 1050, to be described later. The operating unit 110 receives user's instructions for the DFE 101. The network communication controller 111 is connected to the communication network 104 and controls communication between the DFE 101 and the host computer 103. The network communication controller 112 is connected to the network communication controller 119 via the local network line 105 and controls the DFE 101 to carry out communications with the MFP 102.

The image transfer unit 113 is connected to the image receiving unit 120 via the image data transfer line 106 and transfers BMP, which is generated by carrying out a RIP process on PDL data included in a print job received from the host computer 103, to the image receiving unit 120 of the MFP 102. BMP is usually large and thus transferred from the DFE 101 to the MFP 102 via the image data transfer line 106, which is a dedicated line, but may be transferred from the DFE 101 to the MFP 102 via the local network line 105.

In the MFP 102, the CPU 115, for example, executes a variety of programs stored in the HDD 117 to control image data and component elements of the MFP 102. The RAM 116 is a work memory for the CPU 115 and stores computation data on the CPU 115 and a variety of programs. The HDD 117 stores image data such as a BMP 206, to be described later, and a large volume of data such as a variety of setting data. The nonvolatile memory 118 is a nonvolatile storage device and stores, for example, a control program for use in starting the MFP 102.

The network communication controller 119 is connected to the network communication controller 112 of the DFE 101 via the local network line 105 and controls the MFP 102 to carry out communications with the DFE 101. The image receiving unit 120 receives BMP transferred from the image transfer unit 113 of the DFE 101. The operating panel 121, which is a touch panel, receives a variety of instructions from a user. The scanner 122 reads originals to generate image data. The printer engine 123 prints image data on recording sheets.

Figure 2:
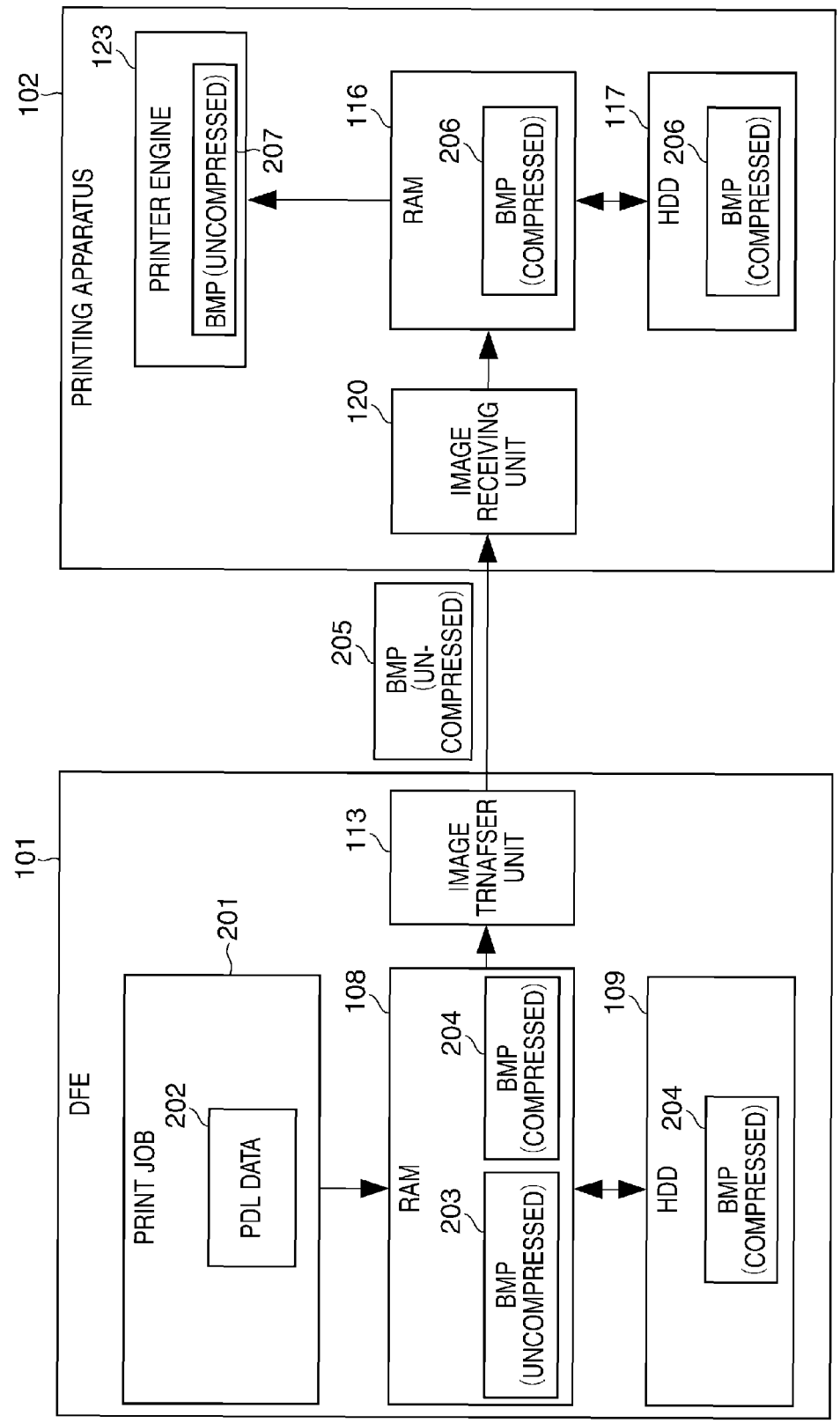
FIG. 2 is a diagram useful in explaining BMP transferred from the DFE to the MFP in FIG. 1.

FIG. 2 is a diagram useful in explaining BMP which is transferred from the DFE 101 to the MFP 102 in FIG. 1.

Referring to FIG. 2, first, the DFE 101 receives a print job 201, which includes PDL data 202 and a variety of printing conditions, from the host computer 103 and carries out a RIP process on the PDL data 202 included in the print job 201 to generate BMP 203. Next, the DFE 101 stores the BMP 203 in the RAM 108, subjects the BMP 203 to a lossless compression process (a lossless compression method, a first compression method) to generate the BMP 204 by compressing the size of the BMP 203 and stores the BMP 204 in the HDD 109. Here, the lossless compression process is a process in which image data is compressed such that no data is lost, and the quality of the BMP 204 that has been subjected to the lossless compression process is equivalent to that of the BMP 203 that has not yet been subjected to the lossless compression process. On the other hand, the size of the BMP 204 that has been subjected to the lossless compression process is not so smaller than that of the BMP 203 that has not yet been subjected to the lossless compression process.

Then, with predetermined timing, for example, the timing with which a user instructs the DFE 101 to perform printing, the DFE 101 reads out the BMP 204 from the HDD 109 into the RAM 108, and the image transfer unit 113 transfers the BMP 204 to the MFP 102 while decompressing the same. The image receiving unit 120 receives BMP 205 obtained by decompressing the BMP 205. The MFP 102 subjects the BMP 205 to a the lossless compression process or a lossy compression process (a lossy compression method, a second compression method) to generate BMP 206 by compressing the size of the BMP 205. The image receiving unit 120 stores the generated BMP 206 successively in the RAM 116 and the HDD 117. The MFP 102 reads out the BMP 206 from the HDD 117 into the RAM 116 and transfers the BMP 206 from the RAM 116 to the printer engine 123 while decompressing the same. BMP 207 obtained by decompressing the BMP 206 is transferred to the printer engine 123 and then printed.

Here, the lossy compression process is a process in which image data is compressed such that data is partially lost. The compression efficiency of the lossy compression process is higher than that of the lossless compression process, and hence, for example, the size of the BMP 206 obtained by subjecting the BMP 205 to the lossy compression process is smaller than that of the BMP 206 obtained by subjecting the BMP 205 to the lossless compression process. On the other hand, data is partially lost in the lossy compression process, and hence, for example, the quality of the BMP 206 obtained by subjecting the BMP 205 to the lossy compression process is worse than that of the BMP 206 obtained by subjecting the BMP 205 to the lossless compression process.

The lossless compression process carried out in the MFP 102 (hereafter referred to as "the lossless compression process/MFP") is similar to the lossless compression process carried out in the DFE 101 (hereafter referred to as "the lossless compression process/DFE"). Namely, as with the lossless compression process/DFE, the lossless compression process/MFP is a process in which image data is compressed such that no data is lost. However, the lossless compression process/MFP and the lossless compression process/DFE are not completely the same identical lossless compression process. For example, a JPEG-LS compression method is adopted for the lossless compression process/MFP, and a JPEG-LS based compression method, which is an improved version of the JPEG-LS compression method, is adopted for the lossless compression process/DFE. Therefore, the size of BMP obtained by subjecting BMP of a predetermined size to the lossless compression process/MFP may not be equal to that of BMP obtained by subjecting BMP of a predetermined size to the lossless compression process/DFE. On the other hand, the size of BMP that has been subjected to the lossless compression process/MFP and the size of BMP that has been subjected to the lossless compression process/DFE are correlated to each other as will be described later. Namely, the DFE 101 is able to, for example, estimate the size of the BMP 206, which is obtained by subjecting the BMP 205 to the lossless compression process/MFP, based on the size of the BMP 204, which is obtained by subjecting the BMP 203 to the lossless compression process/DFE.

Figure 3:
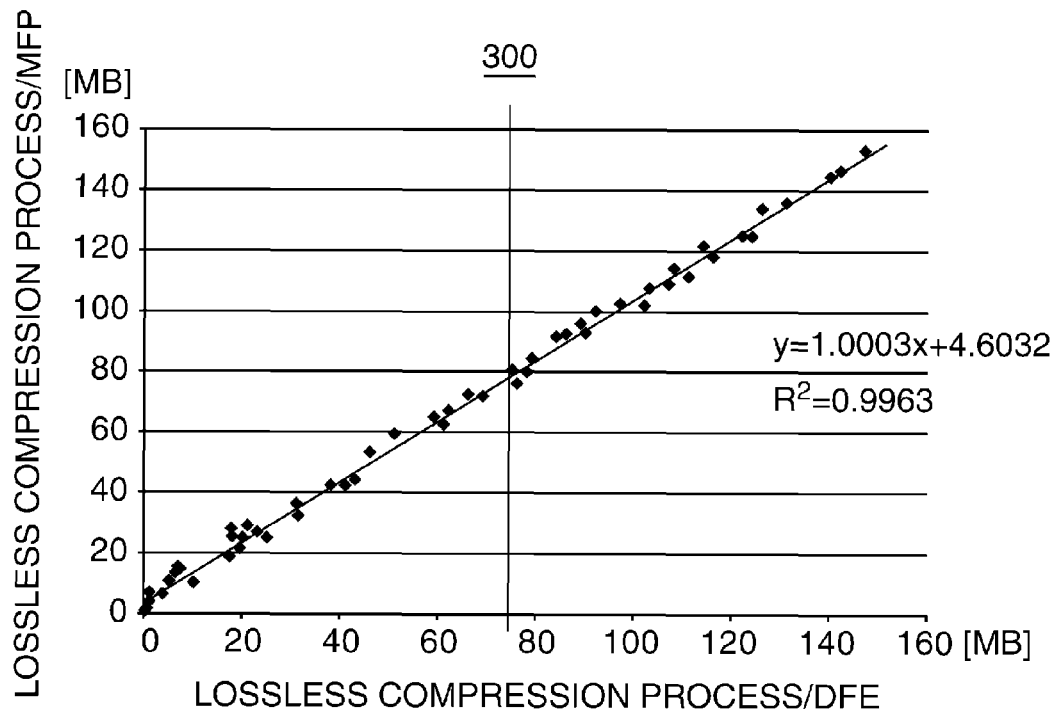
FIG. 3 is a view showing a correlation graph useful in explaining the correlation between sizes of BMP after a lossless compression process/DFE and a lossless compression process/MFP.

FIG. 3 is a view showing a correlation graph 300 useful in explaining the correlation between sizes of BMP after the lossless compression process/DFE and the lossless compression process/MFP carried out in the DFE 101 and the MFP 102, respectively, in FIG. 2.

The correction graph 300 was created by plotting sizes of BMP obtained by subjecting BMP of multiple sizes to the lossless compression process/DFE (Example 1) and sizes of BMP obtained by subjecting BMP of multiple sizes to the lossless compression process/MFP (Example 2). In the correlation graph 300, the horizontal axis indicates sizes of BMP obtained by carrying out the lossless compression process/DFE, and the vertical axis indicates sizes of BMP obtained by carrying out the lossless compression process/MFP. In the correlation graph 300, a coefficient of determination (an R-squared value: $R^2$) for an approximate curve of those BMP sizes is 0.996, and it was found out that the size of BMP obtained by carrying out the lossless compression process/DFE and the size of BMP obtained by carrying out the lossless compression process/MFP are correlated to each other.

Therefore, the size of BMP obtained by carrying out the lossless compression process/MFP is estimated based on the size of BMP obtained by carrying out the lossless compression process/DFE as well as the correlation graph 300. For example, when the size of BMP obtained by carrying out the lossless compression process/DFE is 75 MB, the size of BMP obtained by carrying out the lossless compression process/MFP is estimated to be approximately 80 MB.

Figure 4:
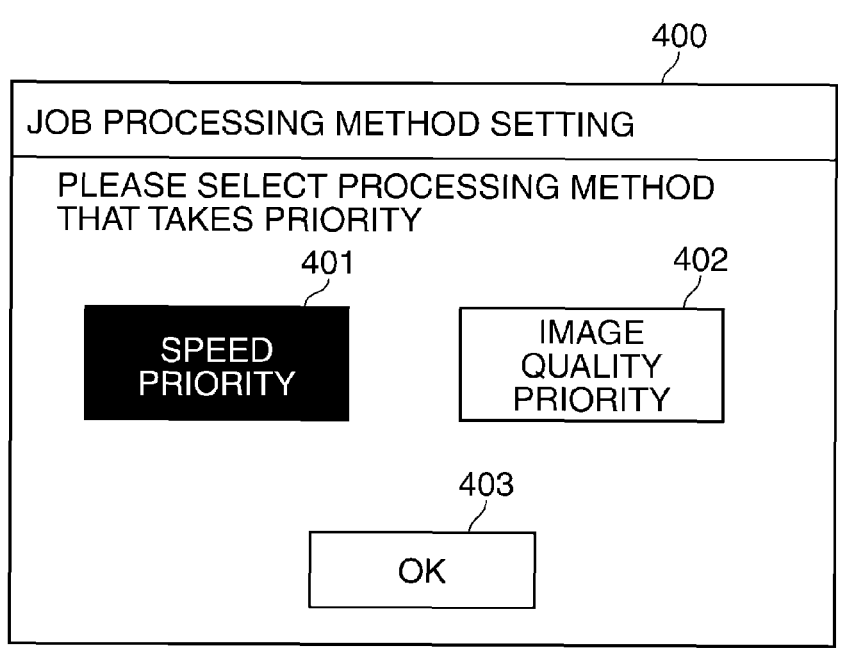
FIG. 4 is a view useful in explaining an instruction screen displayed on an operating unit of the DF in FIG. 1.

FIG. 4 is a view useful in explaining an instruction screen 400 displayed on the operating unit 110 of the DFE 101 in FIG. 1.

The instruction screen 400 has a speed priority button 401, an image quality priority button 402, and an OK button 403. When a user wishes to end a printing process within a short time period, he or she selects the speed priority button 401, and when he or she wishes to obtain a printed matter with high quality, he or she selects the image quality priority button 402. After selecting one of the speed priority button 401 and the image quality priority button 402, the user depresses the OK button 403.

When the speed priority button 401 is selected, the time period required for a printing process is equal to or shorter than the time period required for a printing process carried out when the image quality priority button 402 is selected. On the other hand, when the speed priority button 401 is selected, the quality of a printed matter is equal to or worse than that of a printed matter obtained when the image quality priority button 402 is selected.

FIGS. 5A and 5B are diagrams useful in explaining the threshold lists 500 and 550 stored in the HDD 109 of the DFE 101 in FIG. 1. FIG. 5A shows the threshold list 500 for the MFP 102 the printing speed of which is 80 ppm (page per minute) and the model name of which is A. FIG. 5B shows the threshold list 550 for the MFP 102 the printing speed of which is 70 ppm and the model name of which is B. Namely, in the present embodiment, threshold lists are configured for respective types of MFPs connected as the MFP 102.

The threshold lists 500 and 550 have a recording sheet size field 501 and a threshold image size field 502. The recording sheet size field 501 shows sizes of recording sheets for use in printing. The threshold image size field 502 shows sizes of the BMP 206, which influence writing speeds (storage speeds) at which the BMP 206 is stored in the HDD 117 of the MFP 102, for respective sizes of recording sheets shown in the recording sheet size field 501.

Specifically, in the threshold list 500, a threshold image size 502a for A4 in the threshold image size field 502 is 66 MB. When the size of the BMP 206 stored in the RAM 116 is larger than 66 MB, the writing speed at which the BMP 206 is stored in the HDD 117 decreases to become lower than the printing speed at which the BMP 206 transferred to the printer engine 123 is printed. On the other hand, when the size of the BMP 206 stored in the RAM 116 is equal to or smaller than 66 MB, the writing speed at which the BMP 206 is stored in the HDD 117 does not decrease and remains higher than the printing speed at which the BMP 206 transferred to the printer engine 123 is printed.

Namely, a size of BMP shown in the threshold image size field 502 (hereafter referred to as a "threshold size") is a size of the BMP 206 when the writing speed at which the BMP 206 is stored in the HDD 117 and the printing speed at which the BMP 206 transferred to the printer engine 123 is printed are the same.

Figure 6:
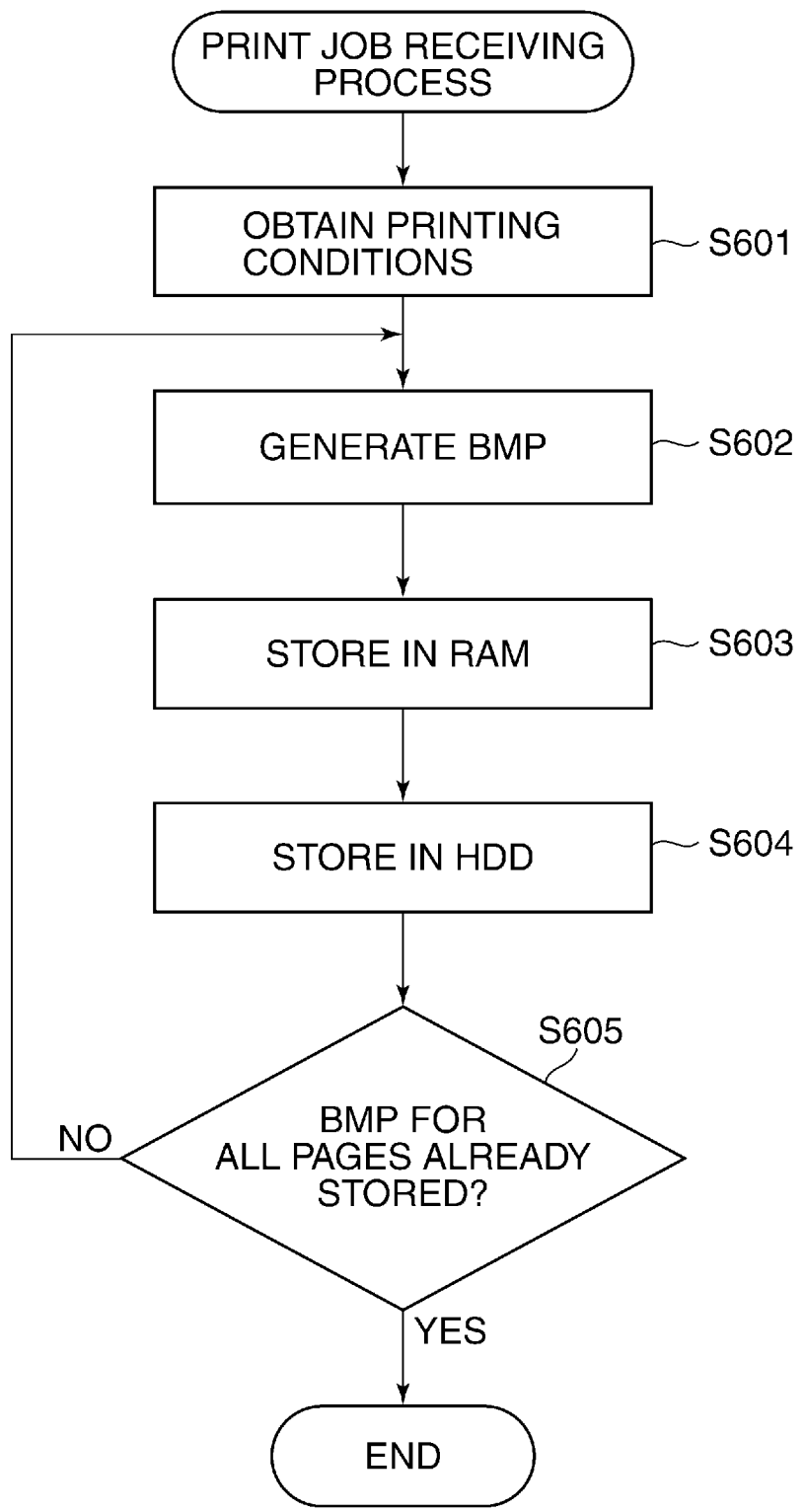
FIG. 6 is a flowchart showing the procedure of a print job receiving process that is carried out by a CPU of the DFE in FIG. 1.

FIG. 6 is a flowchart showing the procedure of a print job receiving process that is carried out by the CPU 107 of the DFE 101 in FIG. 1. A print job received in the process of FIG. 6 includes print data comprised of a plurality of pages, and it is assumed that the process in FIG. 6 is carried out in sequence from the first page of the print data.

Referring to FIG. 6, first, the CPU 107 receives a print job and analyzes the print job to obtain printing conditions such as a size of a recording sheet for use in printing, the number of copies, and setting conditions for a finishing process (step S601). Next, the CPU 107 carries out a RIP process on a predetermined page (hereafter referred to as "the Nth page") constituting print data to generate the BMP 203 (step S602) and stores the generated BMP 203 in the RAM 108 (step S603). Namely, the CPU 107 generates the BMP 203 for each page and stores the generated BMP 203 in the RAM 108.

Then, the CPU 107 stores the BMP 204, which is obtained by subjecting the respective BMP 203 to the lossless compression process/DFE, in the HDD 109 (step S604) and determines whether or not the BMP 204 for all the pages constituting the print data is stored in the HDD 109 (step S605). As a result of the determination in the step S605, when the BMP 204 for all the pages constituting the print data is not stored in the HDD 109, the process returns to the step S602. On the other hand, when the BMP 204 for all the pages constituting the print data is stored in the HDD 109, the present process is brought to an end.

Figure 7:
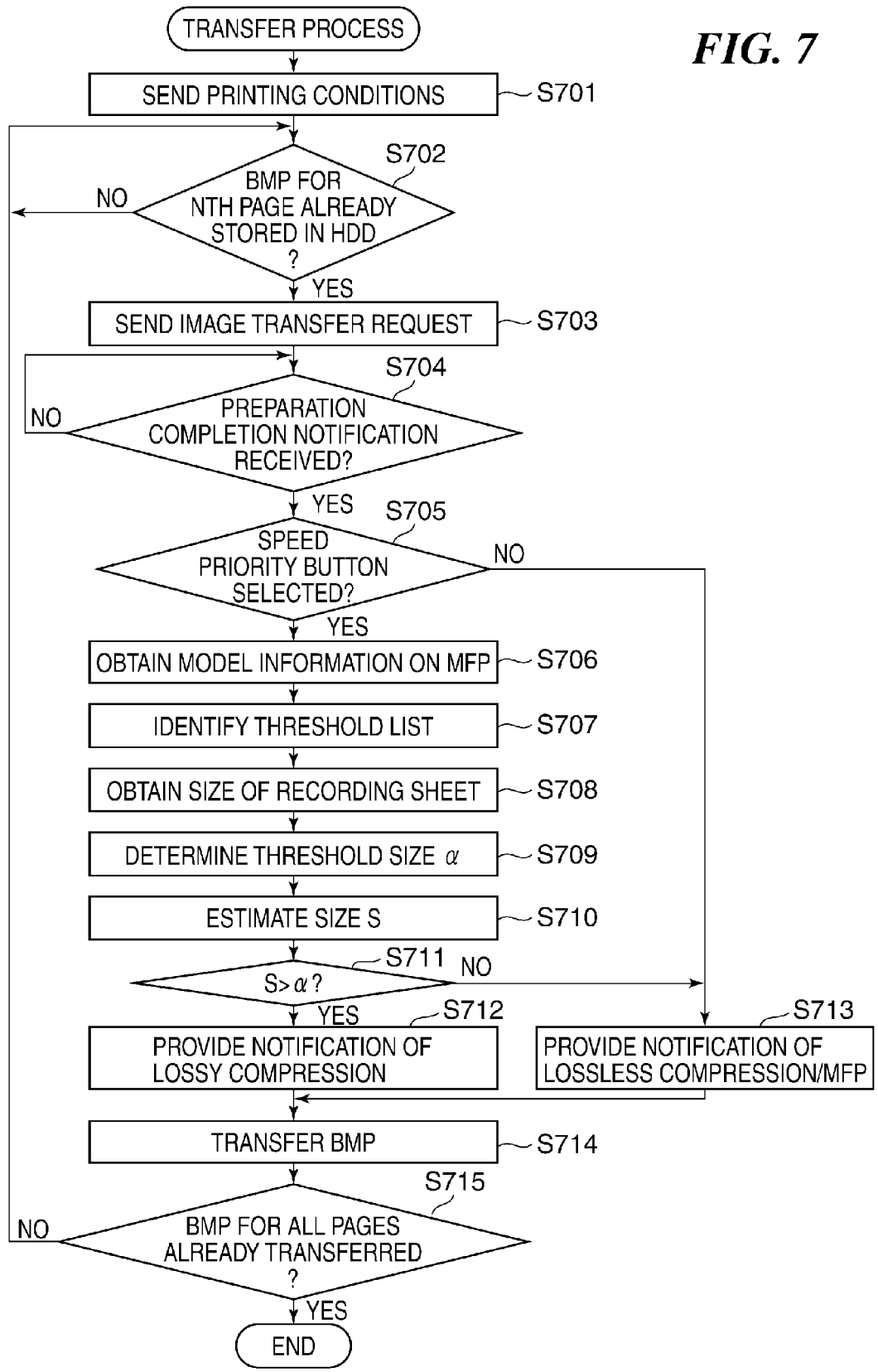
FIG. 7 is a flowchart showing a transfer process in which BMP stored in the HDD in step S604 in FIG. 6 is transferred to the MFP.

FIG. 7 is a flowchart showing a transfer process in which the BMP 204 stored in the HDD 109 in the step S604 in FIG. 6 is transferred to the MFP 102. The process in FIG. 7 is carried out by the CPU 107 of the DFE 101 and is carried out, for example, when a printing instruction is received from the user via the operating unit 110 of the DFE 101 or immediately after the print job receiving process described above is ended.

In the process in FIG. 7, first, the CPU 107 sends various printing conditions obtained in the step S601 in the print job receiving process described above to the MFP 102 via the local network line 105 (step S701). Next, the CPU 107 determines whether or not the BMP 204 that corresponds to the Nth page and has been subjected to the lossless compression process/DFE is stored in the HDD 109 (step S702).

As a result of the determination in the step S702, when the BMP 204 that corresponds to the Nth page and has been subjected to the lossless compression process/DFE is not stored in the HDD 109, the process returns to the step S702. On the other hand, when the BMP 204 that corresponds to the Nth page and has been subjected to the lossless compression process/DFE is stored in the HDD 109, the CPU 107 sends an image transfer request to the MFP 102 (step S703). Then, the CPU 107 determines whether or not a preparation completion notification has been received from the MFP 102 as a response to the image transfer request (step S704).

As a result of the determination in the step S704, when the preparation completion notification has not been received, the process returns to the step S704, and when the preparation completion notification has been received, the CPU 107 determines whether or not the user has selected the speed priority button 401 (step S705). As a result of the determination in the step S705, when the user has selected the image quality priority button 402, the process proceeds to step S713, to be described later. On the other hand, when the user has selected the speed priority button 401, the CPU 107 obtains model information on the MFP 102 from the MFP 102 via the local network line 105 (step S706). After that, the CPU 107 identifies a threshold list coinciding with the obtained model information from the threshold lists 500 and 550 (step S707) and obtains a size of a recording sheet for use in printing the Nth page as the printing condition obtained in the step S601 (step S708). Then, the CPU 107 determines a threshold size α for the Nth page based on the identified threshold list and the obtained size of the recording sheet (step S709).

In step S710, the CPU 107 obtains a size of the BMP 204 for the Nth page that has been subjected to the lossless compression process/DFE, and based on the obtained size of the BMP 204 and the correlation graph 300 in FIG. 3, estimates a size S of the BMP 206 that has been subjected to the lossless compression process/MFP. After that, the CPU 107 determines whether or not the estimated size S is larger than the threshold size α (step S711).

As described earlier, the threshold size α is a size of the BMP 206 when the writing speed at which the BMP 206 is stored in the HDD 117 and the printing speed at which the BMP 206 transferred to the printer engine 123 is printed are the same. Therefore, when the size of the BMP 206 is larger than the threshold size α, the writing speed at which the BMP 206 is stored in the HDD 117 decreases to become lower than the printing speed at which the BMP 206 transferred to the printer engine 123 is printed. As a result, the time period required for the BMP 206 to be stored in the HDD 117 is longer than the time period required for the BMP 206 transferred to the printer engine 123 to be printed, and hence the printer engine 123 stands by until the BMP 206 is stored in the HDD 117. On the other hand, when the size of the BMP 206 is equal to or smaller than the threshold size α, the writing speed at which the BMP 206 is stored in the HDD 117 does not decrease and remains higher than the printing speed at which the BMP 206 transferred to the printer engine 123 is printed. As a result, the time period required for the BMP 206 to be stored in the HDD 117 is shorter than the time period required for the BMP 206 transferred to the printer engine 123 to be printed. Namely, the printer engine 123 does not stand by until the BMP 206 is stored in the HDD 117. Therefore, when the estimated size S of the BMP 206 is larger than the threshold size α, it is necessary to carry out the lossy compression process on the BMP 205 so that the estimated size S of the BMP 206 can be equal to or smaller than the threshold size α so as to prevent the printer engine 123 from standing by.

Thus, as a result of the determination in the step S711, when the size S is larger than the threshold size α, the CPU 107 notifies the MFP 102 that the BMP 205 for the Nth page should be subjected to the lossy compression process (step S712). On the other hand, when the size S is equal to or smaller than the threshold size α, the CPU 107 notifies the MFP 102 that the BMP 205 for the Nth page should be subjected to the lossless compression process/MFP (step S714). After that, the CPU 107 transfers the BMP 204 for the Nth page to the MFP 102 (step S714) and determines whether or not the BMP 204 for all the pages constituting the print data has been transferred (step S715). As a result of the determination in the step S715, when the BMP 204 for all the pages constituting the print data has not been transferred, the process returns to the step S702, and when the BMP 204 for all the pages constituting the print data has been transferred, the present process is brought to an end.

Figure 8:
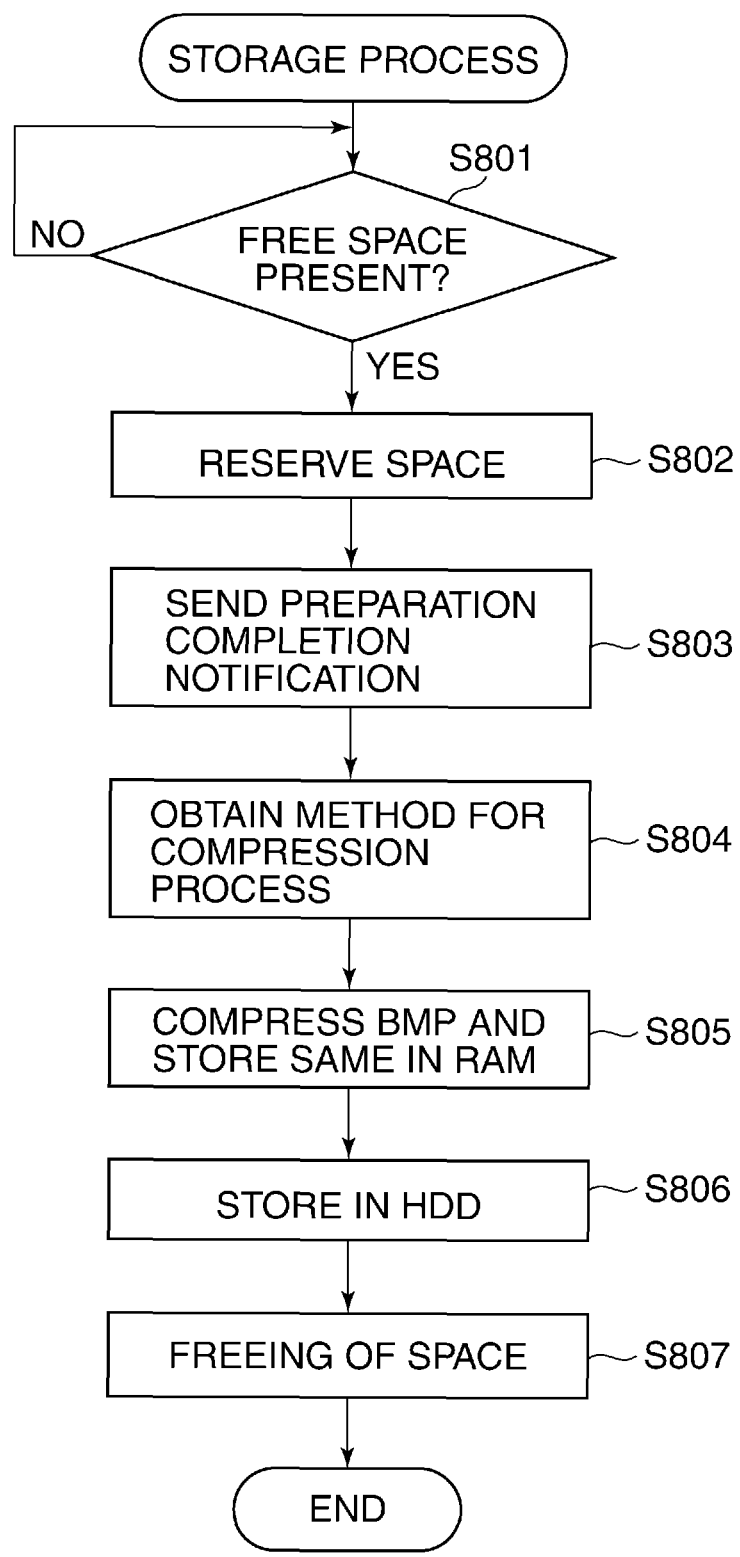
FIG. 8 is a flowchart showing the procedure of a storage process in which the MFP that has received an image transfer request in step S704 in FIG. 7 stores BMP in an HDD.

FIG. 8 is a flowchart showing the procedure of a storage process in which the MFP 102 that has received an image transfer request in the step S704 in FIG. 7 stores the BMP 206 in the HDD 117. The process in FIG. 8 is carried out by the CPU 115 of the MFP 102.

Referring to FIG. 8, first, upon receiving an image transfer request, the CPU 115 determines whether or not in the RAM 116, there is any free space for storing the BMP 205 transferred from the DFE 101 (step S801). As a result of the determination in the step S801, when there is not the free space in the RAM 116, the process returns to the step S801, and when there is the free space, the CPU 115 reserves a space for storing the transferred BMP 205 in the RAM 116 (step S802).

Next, the CPU 115 sends a preparation completion notification, which indicates that a preparation to receive the BMP 205 has been completed, to the DEF 101 as a response to the image transfer request (step S803). Then, the CPU 115 obtains a method for a compression process that is to be carried out on the BMP 205 and the notification of which was provided from the DFE 101 in the step S712 or S713 described above (step S804). Upon obtaining the method for the compression process, the CPU 115 receives the BMP 205 from the DFE 101 through the image receiving unit 120 and stores the BMP 205 in the RAM 116 while compressing it using the obtained method for the compression process (step S805). After that, the CPU 115 stores the BMP 206, which is stored in the RAM 116, in the HDD 117 (step S806), frees the space reserved in the RAM 116 in the step S802 (step S807), and ends the present process.

Figure 9:
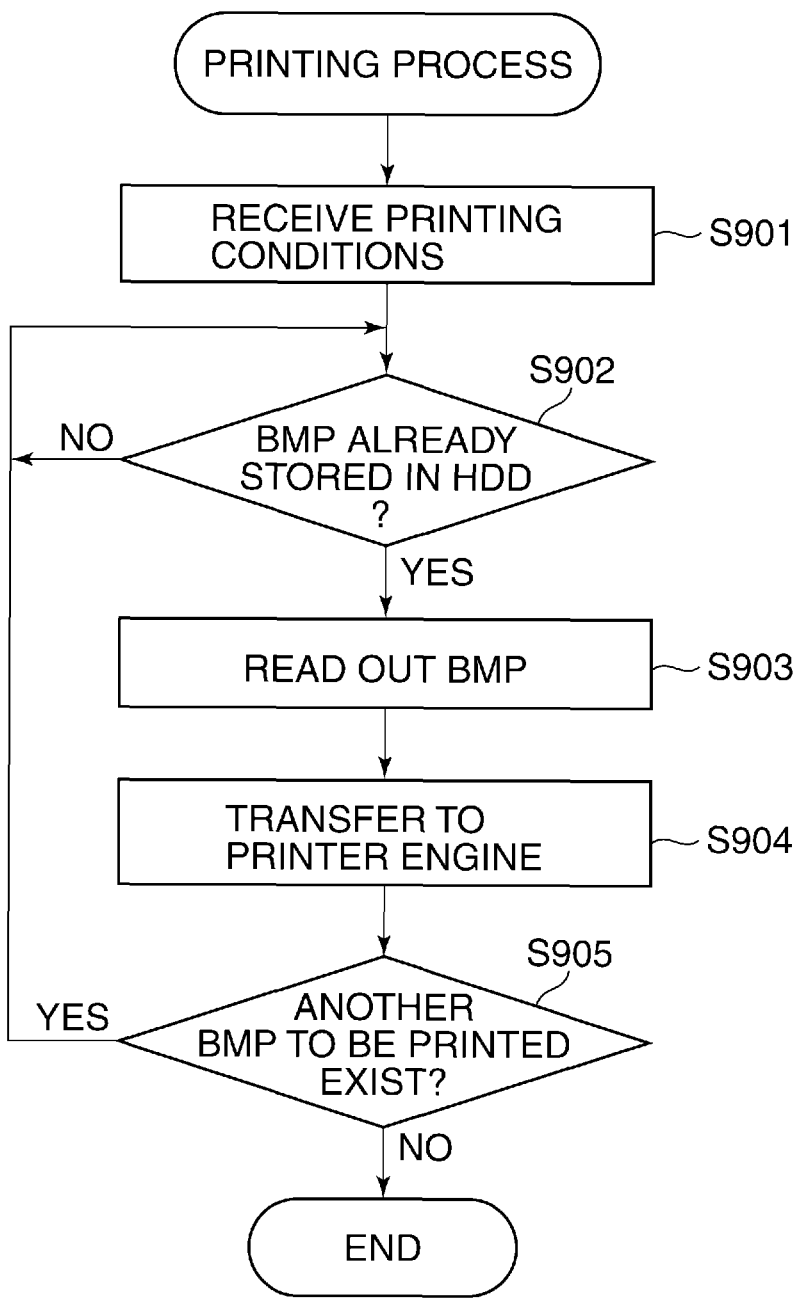
FIG. 9 is a flowchart showing the procedure of a printing process in which the BMP stored in the HDD in step S806 in FIG. 8 is printed.

FIG. 9 is a flowchart showing the procedure of a printing process in which the BMP 206 stored in the HDD 117 in the step S806 in FIG. 8 is printed. The process in FIG. 9 is carried out by the CPU 115 of the MFP 102.

Referring to FIG. 9, first, the CPU 115 receives various printing conditions transmitted from the DFE 101 in the step S701 described above (step S901) and determines whether or not the BMP 206 is stored in the HDD 117 (step S902). As a result of the determination in the step S902, when the BMP 206 is not stored in the HDD 117, the process returns to the step S902, and when the BMP 206 is stored in the HDD 117, the CPU 115 loads the BMP 206 into RAM 116 (step S903). Next, the CPU 115 transfers the BMP 206 loaded in the RAM 116 to the printer engine 123 while decompressing the same (step S904), and the BMP 207 is printed on a recording sheet by the printer engine 123. After the BMP 207 is printed, the CPU 115 determines whether or not any other BMP 206 to be printed is stored in the HDD 117 (step S905). As a result of the determination in the step S905, when any other BMP 206 to be printed is stored in the HDD 117, the process returns to the step S902, and when no other BMP 206 to be printed is stored in the HDD 117, the present process is brought to an end.

According to the process in FIG. 7, when the size S is larger than the threshold size $\alpha$ (YES in the step S711), the MFP 102 is notified that the BMP 205 for the Nth page should be subjected to the lossy compression process (step S712). On the other hand, when the size S is equal to or smaller than the threshold size $\alpha$, the MFP 102 is notified that the BMP 205 for the Nth page should be subjected to the lossless compression process/MFP (step S713). When the size S is larger than the threshold size $\alpha$, the time period required for the BMP 206 to be stored in the HDD 117 is longer than the time period required for the BMP 206 transferred to the printer engine 123 to be printed. As a result, the MFP 102 stands by until the BMP 206 is stored in the HDD 117 so as to be printed. Namely, in the present embodiment, it is necessary to prevent the time period required for the compressed BMP 206 to be stored in the HDD 117 from becoming longer than the time period required for the BMP 206 to be printed. Accordingly, when the size S is larger than the threshold size $\alpha$, the DFE 101 notifies the MFP 102 that the BMP 205 should be subjected to the lossy compression process. This eliminates the need to send by until the BMP 206 is stored in the HDD 117 so as to be printed. As a result, a printing process is prevented from taking long. When the size S is equal to or smaller than the threshold size $\alpha$, even if the BMP 205 is subjected to the lossless compression process/MFP, the time period required for the compressed BMP 206 to be stored in the HDD 117 will never be longer than the time period required for the BMP 206 to be printed after being transferred to the printer engine 123. Therefore, when the size S is equal to or smaller than the threshold size $\alpha$, the DFE 101 notifies the MFP 102 that the BMP 205 should be subjected to the lossless compression process/MFP. This prevents the quality of the BMP 206 from unnecessarily degrading due to the necessity for standing by until the BMP 206 is stored in the HDD 117.

Moreover, according to the process in FIG. 7, the MFP 102 is notified that the BMP 205 should be subjected to the lossy compression process or the lossless compression process/MFP (steps S712, S713). The compression efficiency of the lossy compression process is higher than that of the lossless compression process/MFP. Thus, when the size S of the BMP 205 compressed using the lossless compression process/MFP is larger than the threshold size $\alpha$, the BMP 205 is subjected to the lossy compression process so that the size S of the BMP 205 can be smaller than the size S of the BMP 205 compressed using the lossless compression process/MFP. This prevents the compressed BMP 205 from becoming larger than the threshold size $\alpha$.

Further, according to the process in FIG. 7, when the user selects the speed priority button 401 (YES in the step S705), the MFP 102 is notified that the BMP 205 should be subjected to the lossy compression process (step S712). On the other hand, when the user selects the image quality priority button 402 (NO in the step S705), the MFP 102 is notified that the BMP 205 should be subjected to the lossless compression process/MFP (step S713). This reflects the intention of the user himself/herself on the time period required to obtain a printed matter of image data or the quality of the printed matter.

Moreover, according to the process in FIG. 7, since the threshold lists 500 and 550 are stored in the HDD 109 of the DFE 101, the threshold size $\alpha$ is obtained with ease.

A description will now be given of a second embodiment of the present invention.

The second embodiment of the present invention is basically the same as the first embodiment described above in terms of constructions and operations, differing from the first embodiment in that a memory size required to store the BMP 206 in the RAM 116 is referred to. Features of constructions and operations that are the same as in the first embodiment will thus not be described, only features of constructions and operations different from those of the first embodiment being described below.

FIGS. 10A and 10B are diagrams useful in explaining the memory size lists 1000 and 1050 showing memory sizes required to store the BMP 206 in FIG. 2 in the RAM 116. FIG. 10A shows the memory size list 1000 for the MFP 102 the printing speed of which is 80 ppm and the model name of which is A. FIG. 10B shows the memory size list 1050 for the MFP 102 the printing speed of which is 70 ppm and the model name of which is B. Namely, in the present embodiment, memory size lists are configured for respective types of MFPs connected as the MFP 102.

The memory size lists 1000 and 1050 have a recording sheet size field 1001 and a memory size field 1002. The recording sheet size field 1001 shows sizes of recording sheets for use in printing. The memory size field 1002 shows memory sizes, which are required to store the BMP 206 in the RAM 116, for respective sizes of recording sheets shown in the recording sheet size field 1001.

Specifically, in the memory size list 1000, a memory size 1002a for A4 in the memory size field 1001 is 70 MB. When the size of the BMP 206 obtained by carrying out a compression process on the BMP 205 received from the DFE 101 by the MFP 102 is larger than 70 MB, the BMP 206 is not stored in the RAM 116. Accordingly, the MFP 102 requests the DFE 101 to send the BMP 206 again. On the other hand, when the size of the BMP 206 obtained by carrying out a compression process on the BMP 205 received from the DFE 101 by the MFP 102 is equal to or smaller than 70 MB, the BMP 206 is stored in the RAM 116.

Figure 11A:
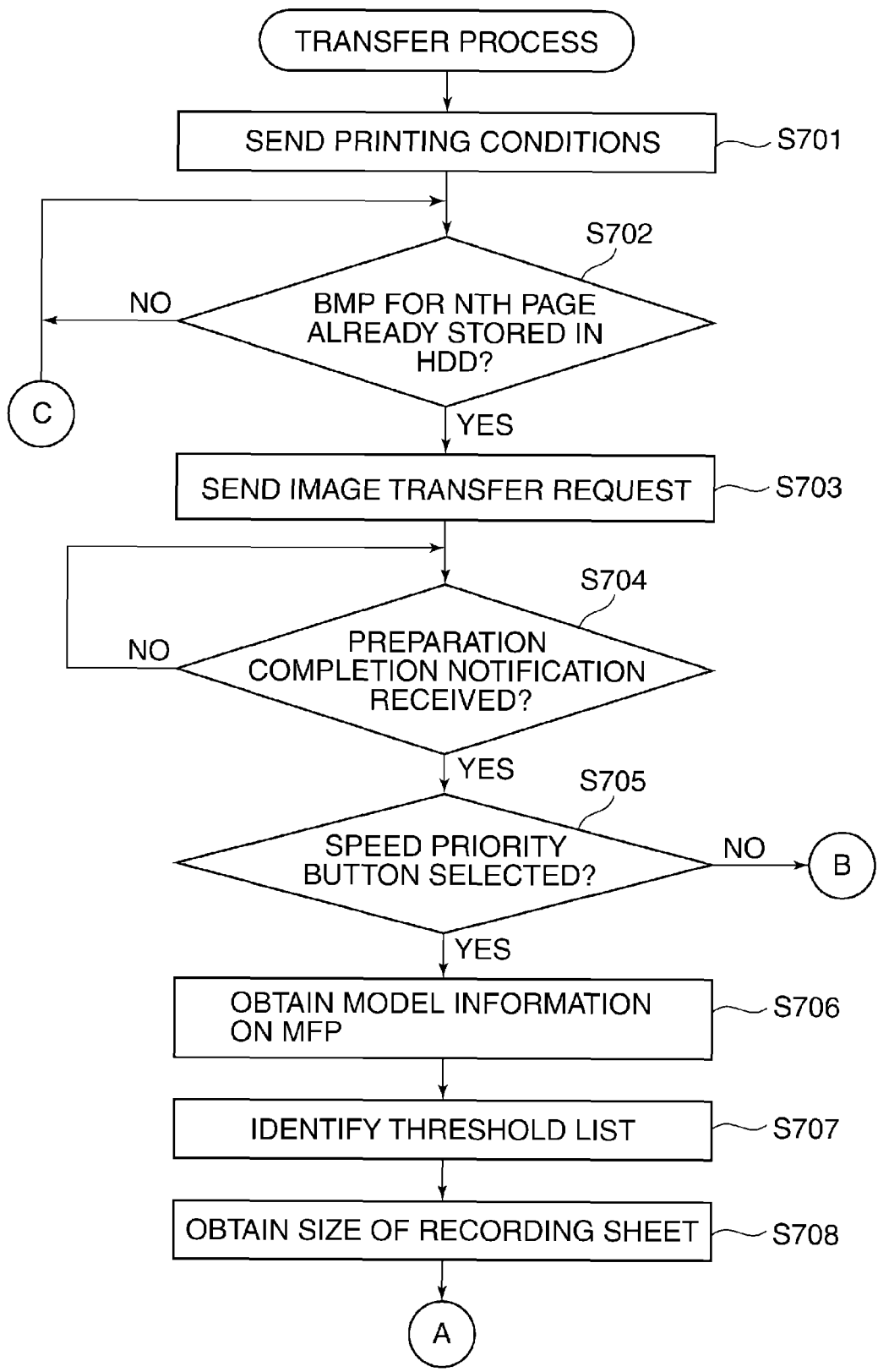
FIGS. 11A and 11B are flowcharts showing the procedure of a transfer process according to the present embodiment.
Figure 11B:
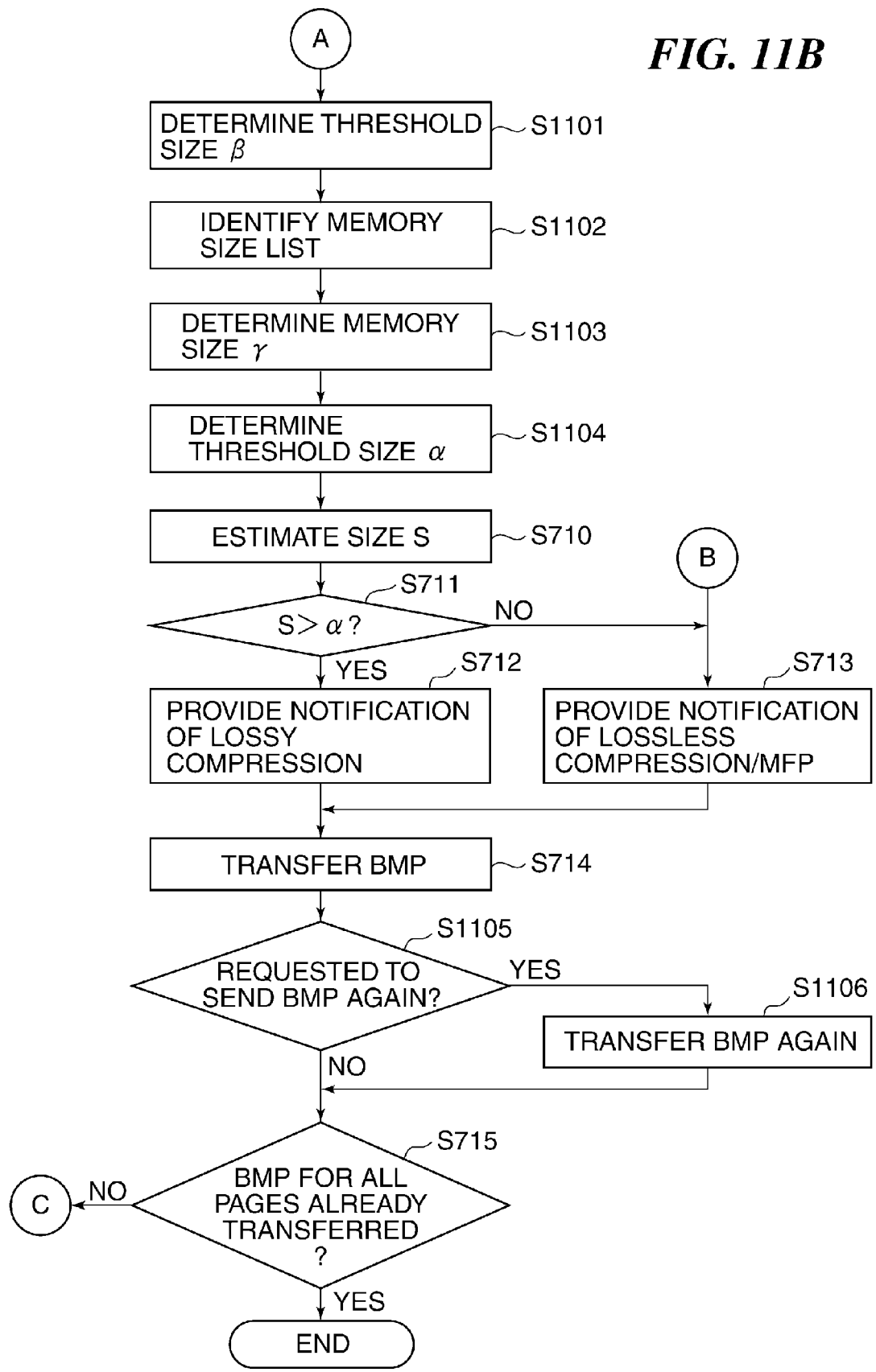

FIGS. 11A and 11B are flowcharts showing the procedure of a transfer process according to the present embodiment. Steps S701 to S708 and S710 to S715 in FIGS. 11A and 11B are the same as the steps S701 to S708 and S710 to S715 in FIG. 7, and hence only features differing from those in FIG. 7 will be described below.

In the step S708 in FIG. 11A, the CPU 107 obtains a size of a recording sheet for use in printing the Nth page. Next, in step S1101, the CPU 107 determines a threshold size β for the Nth page based on a threshold list identified in the step S707 and the obtained size of the recording sheet (step S1101).

In the present embodiment, the threshold size β is a size of the BMP 206 when the writing speed at which the BMP 206 is stored in the HDD 117 and the printing speed at which the BMP 206 transferred to the printer engine 123 is printed are equal. Therefore, when the size of the BMP 206 is larger than the threshold size β, the writing speed at which the BMP 206 is stored in the HDD 117 decreases to become lower than the printing speed at which the BMP 206 transferred to the printer engine 123 is printed. As a result, the time period required for the BMP 206 to be stored in the HDD 117 is longer than the time period required for the BMP 206 transferred to the printer engine 123 to be printed, and hence the printer engine 123 stands by until the BMP 206 is stored in the HDD 117. On the other hand, when the size of the BMP 206 is equal to or smaller than the threshold size β, the writing speed at which the BMP 206 is stored in the HDD 117 does not decrease and remains higher than the printing speed at which the BMP 206 transferred to the printer engine 123 is printed. As a result, the time period required for the BMP 206 to be stored in the HDD 117 is shorter than the time period required for the BMP 206 transferred to the printer engine 123 to be printed. Namely, the printer engine 123 does not stand by until the BMP 206 is stored in the HDD 117.

Then, the CPU 107 identifies a memory size list coinciding with model information on the MFP 102 obtained in the step S706 from the memory size lists 1000 and 1050 (step S1102). After that, based on the identified memory size list and the obtained size of the recording sheet, the CPU 107 determines a memory size γ required to store the BMP 206 in the RAM 116 (step S1103). The CPU 107 then determines a smaller one of the threshold size β and the memory size γ as a threshold size α (step S1104), followed by the process proceeding to the step S710, in which the CPU 107 in turn executes the steps S710 to S714. The case where an estimated size S of the BMP 206 is larger than the threshold size α corresponds to a case where the estimated size S is so large that the printer engine 123 stands by until the BMP 206 is stored in the HDD 117 or the RAM 116 cannot store the BMP 206. Therefore, to eliminate the need to stand by, when an estimated size S of the BMP 206 is larger than the threshold size α, it is necessary to reduce the estimated size S of the BMP 206 by subjecting the BMP 205 to the lossy compression process. Accordingly, in the present embodiment, as with the first embodiment, when an estimated size S of the BMP 206 is larger than the threshold size α, the CPU 107 notifies the MFP 102 that the BMP 205 for the Nth page should be subjected to the lossy compression process (steps S710 to S712).

After that, the CPU 107 determines whether or not it was requested to send the BMP 205 again in step S1205 in FIG. 12, to be described later (step S1105). As a result of the determination in the step S1105, when the CPU 107 was not requested to send the BMP 205 again, the process proceeds to the step S715. On the other hand, when requested to send the BMP 205 again, the CPU 107 transfers the BMP 204 for the Nth page to the MFP 102 again (step S1106), followed by the process proceeding to the step S715.

Figure 12:
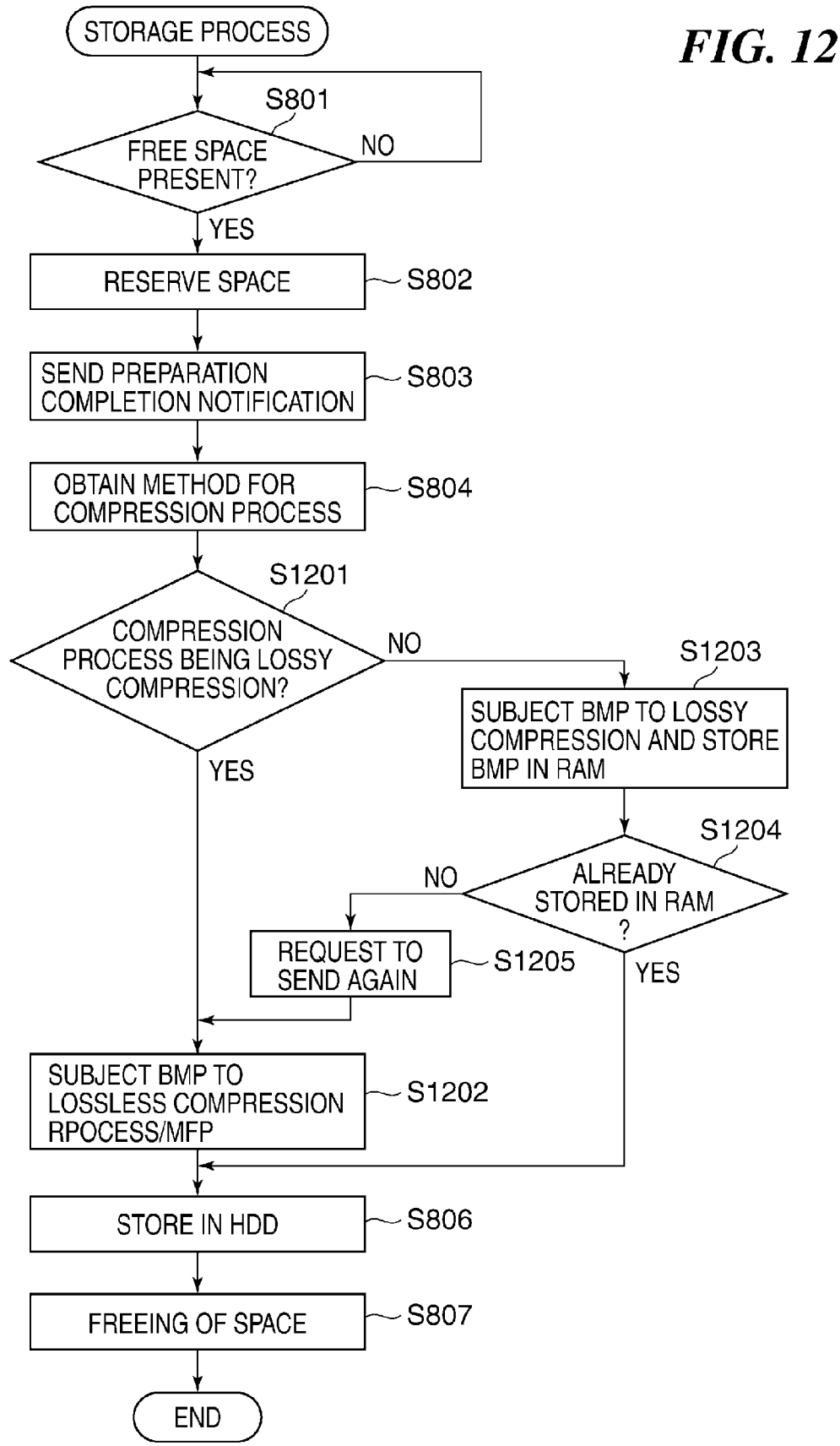
FIG. 12 is a flowchart showing the procedure of a storage process according to the present embodiment.

FIG. 12 is a flowchart showing the procedure of a storage process according to the present embodiment. Steps S801 to S804 and S806 to S807 in FIG. 12 are the same as the steps S801 to S804 and S806 to S807 in FIG. 8, and hence only features differing from those in FIG. 8 will be described below.

Referring to FIG. 12, first, upon obtaining a method for a compression process to be carried out on the BMP 205, the CPU 115 determines whether or not the compression process to be carried out on the BMP 205 is the lossy compression process (step S1201). As a result of the determination in the step S1201, when the compression process to be carried out on the BMP 205 is the lossy compression process, the CPU 115 receives the BMP 205 from the DFE 101 via the image receiving unit 120. Next, the CPU 115 stores the BMP 206, which has been obtained by carrying out the lossy compression process on the BMP 205, in the RAM 116 (step S1202), followed by the process proceeding to the step S806. On the other hand, when the compression process to be carried out on the BMP 205 is the lossless compression process/MFP, the CPU 115 receives the BMP 205 from the DFE 101 via the image receiving unit 120 and subjects the BMP 205 to the lossless compression process/MFP (step S1203). Then, the CPU 115 determines whether or not the BMP 206 obtained by carrying out the lossless compression process/MFP has been stored in the RAM 116 (step S1204).

As a result of the determination in the step S1204, when the BMP 206 has been stored in the RAM 116, the process proceeds to the step S806. On the other hand, when the BMP 206 has not been stored in the RAM 116, the CPU 115 requests the DFE 101 to send the BMP 205 again (step S1205), and when the CPU 115 receives the BMP 205 again, the process proceeds to the step S1202.

According to the process in FIGS. 11A and 11B, the threshold size β determined based on an identified threshold list and a size of a recording sheet and the memory size γ required to store the BMP 206 in the RAM 116 are compared with each other, and a smaller one is determined as the threshold size α (step S1104). Even if an estimated size S of the BMP 206 is smaller than the threshold size β, the BMP 206 cannot be stored in the RAM 116 when the estimated size S is larger than the memory size γ, and the DFE 101 needs to transfer the BMP 205 to the MFP 102 again, which causes processing to take long. Thus, a smaller one of the threshold size β and the memory size γ is determined as the threshold size α, and a method for a compression process to be carried out on the BMP 205 is determined so that a size S of the BMP 206 after the compression process can be smaller than the threshold size α. Therefore, the compressed BMP 206 is reliably stored in the RAM 116. This eliminates the need to transfer the BMP 205 again so as to be stored in the RAM 116 and thus prevents a printing process from taking long.

Figure 13A:
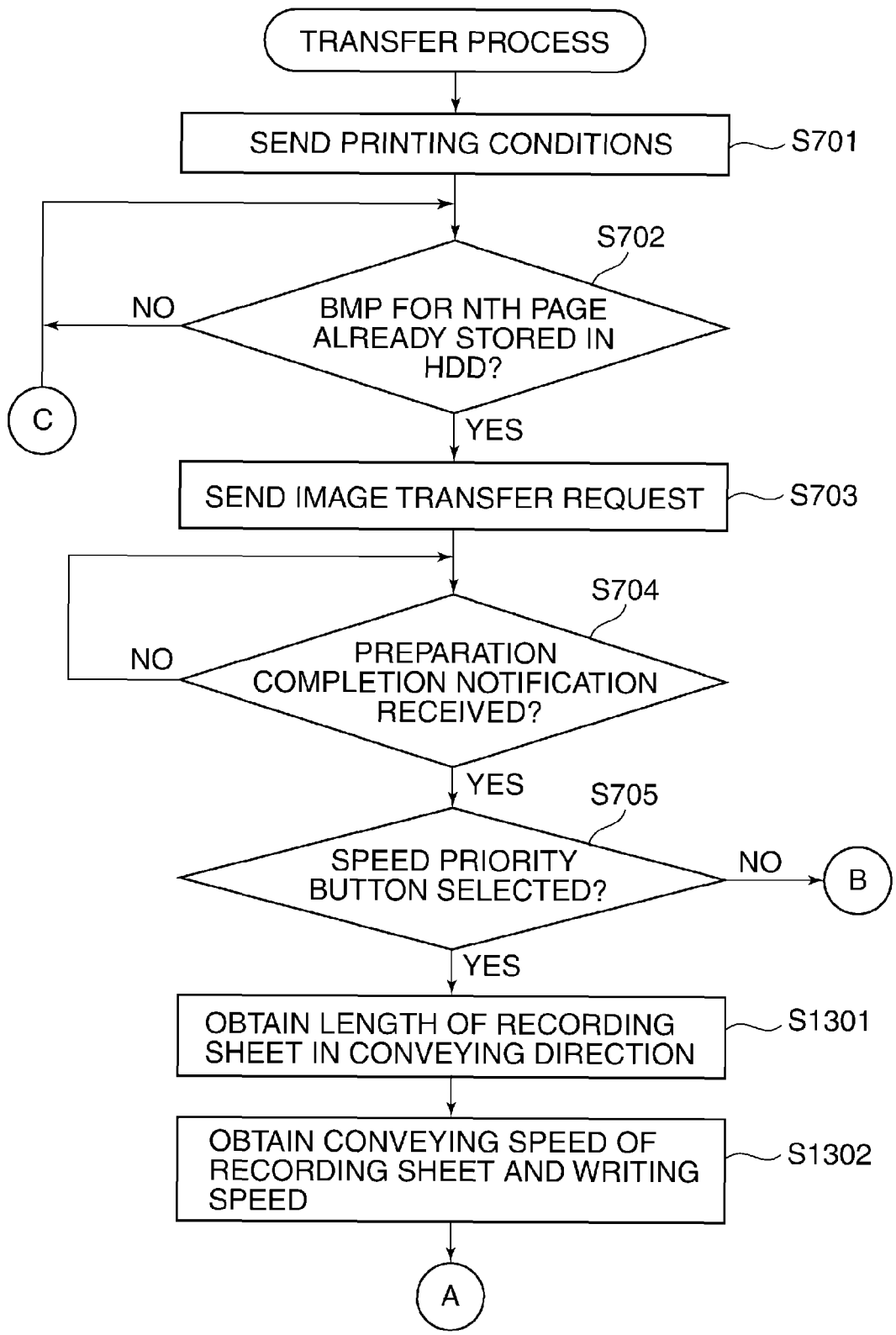
FIGS. 13A and 13B are flowcharts showing the procedure of an exemplary variation of the transfer process in FIGS. 11A and 11B.
Figure 13B:
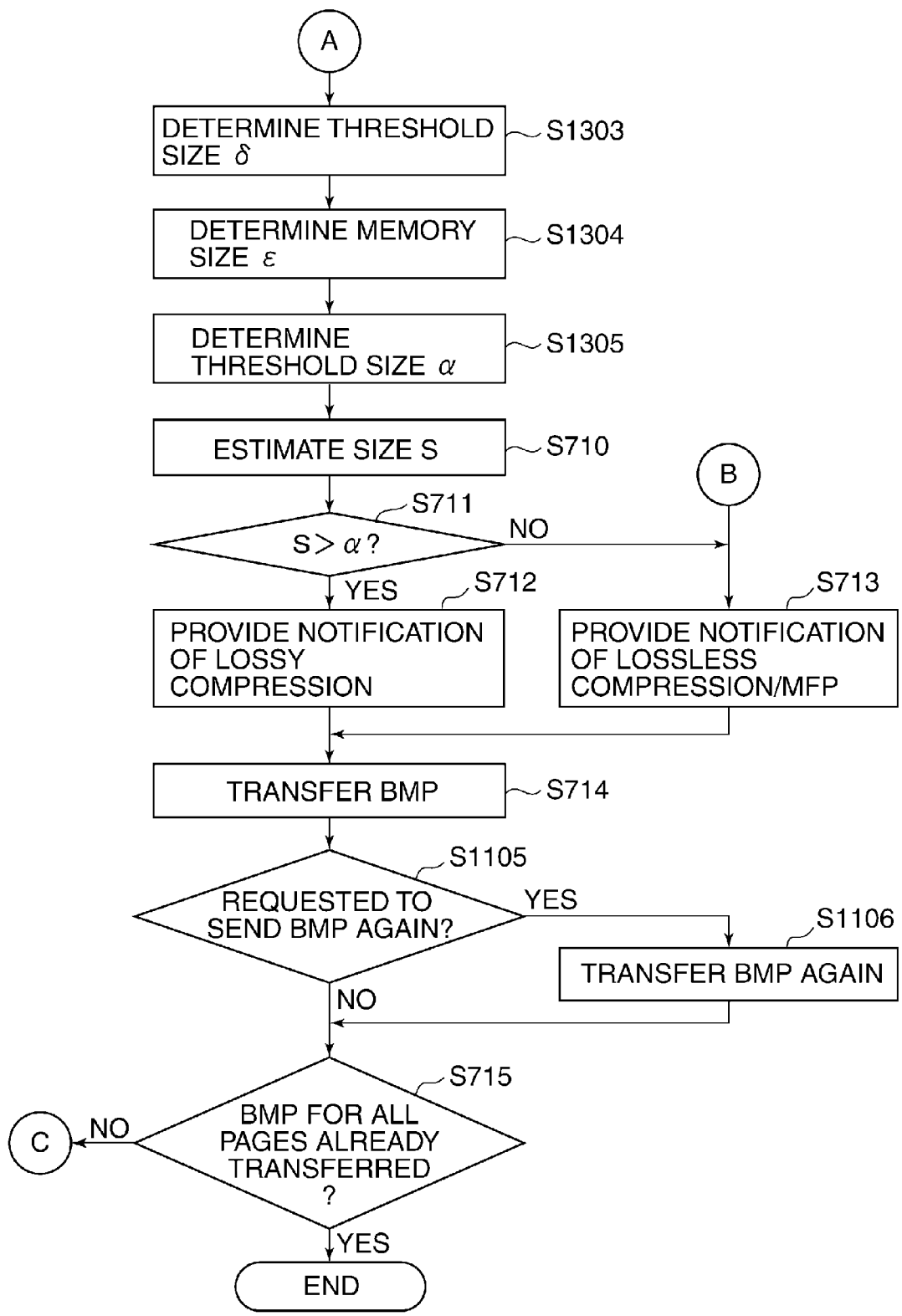

FIGS. 13A and 13B are flowcharts showing the procedure of an exemplary variation of the transfer process in FIGS. 11A and 11B. Steps S701 to S705, S710 to S715, and S1105 to S1106 in FIGS. 13A and 13B are the same as the S701 to S705, S710 to S715, and S1105 to S1106 in FIGS. 11A and 11B, and hence only features differing from those in FIGS. 11A and 11B will be described below.

Referring to FIGS. 13A and 13B, when the speed priority button 401 is selected (YES in the step S705), the CPU 107 obtains a length SL (Sheet Length) of a recording sheet, which is for use in printing the Nth page, in a conveying direction in which it is conveyed into the printer engine 123 (step S1301). Next, the CPU 107 obtains from the MFP 102 a conveying speed (Sheet Speed) at which a recording sheet for use in printing the Nth page is conveyed into the printer engine 123, and a writing speed WS (Writing Speed) at which the BMP 206 is stored in the HDD 117 (step S1302).

It should be noted that information on the length SL of the recording sheet in the conveying direction, the conveying speed SP, and the writing speed WS is stored in the MFP 102 in advance. The DFE 101 obtains the length SL of the recording sheet in the conveying direction, the conveying speed SP, and the writing speed WS by making an inquiry to the MFP 102.

Then, in step S1303, the CPU 107 calculates a threshold size δ using an equation below based on the length SL of the recording sheet in the conveying direction, the conveying speed SP, and the writing speed WS obtained in the steps S1301 and S1302.

[Mathematical Expression 1]

$$\text{Threshold size } \delta \text{ (MB)} = \frac{\text{Length } SL \text{ (mm) of the recording sheet in the conveying direction} \times \text{Writing speed } WS \text{(MB/sec)}}{\text{Conveying speed } SP \text{ (mm/sec)}}$$

The calculated threshold size δ is a size of the BMP 206 when the writing speed at which the BMP 206 is stored in the HDD 117 and the printing speed at which the BMP 206 transferred to the printer engine 123 is printed are the same. Therefore, when the size S of the BMP 206 is larger than the threshold size δ, the writing speed at which the BMP 206 is stored in the HDD 117 decreases to become lower than the printing speed at which the BMP 206 transferred to the printer engine 123 is printed. As a result, the time period required for the BMP 206 to be stored in the HDD 117 is longer than the time period required for the BMP 206 transferred to the printer engine 123 to be printed, and hence the printer engine 123 stands by until the BMP 206 is stored in the HDD 117. On the other hand, when the size of the BMP 206 is equal to or smaller than the threshold size δ, the writing speed at which the BMP 206 is stored in the HDD 117 does not decrease and remains higher than the printing speed at which the BMP 206 transferred to the printer engine 123 is printed. As a result, the time period required for the BMP 206 to be stored in the HDD 117 is shorter than the time period required for the BMP 206 transferred to the printer engine 123 to be printed. Namely, the printer engine 123 does not stand by until the BMP 206 is stored in the HDD 117.

Then, the CPU 107 obtains a memory size ϵ, which is required to store the compressed BMP 206 in the RAM 116, from the MFP 102 (step S1304). After that, the CPU 107 compares the threshold size δ and the memory size ϵ to each other and determines a smaller one of them as a threshold size α (step S1305), followed by the process proceeding to the step S710, in which the CPU 107 in turn executes the steps S710 to S714. In this variation as well, the case where an estimated size S of the BMP 206 is larger than the threshold size α corresponds to a case where the estimated size S is so large that the printer engine 123 stands by until the BMP 206 is stored in the HDD 117 or the RAM 116 cannot store the BMP 206. Therefore, in this variation as well, as with the second embodiment, when an estimated size S of the BMP 206 is larger than the threshold size α, the CPU 107 notifies the MFP 102 that the BMP 205 for the Nth page should be subjected to the lossy compression process (steps S710 to S712).

According to the process in FIGS. 13A and 13B, the threshold size δ is calculated based on the length SL of a recording sheet in the conveying direction, the writing speed WS, and the conveying speed SP. This eliminates the need for the DFE 101 to store in advance the threshold lists 500 and 550 according to types and printing speeds of the MFPs 102.

It should be noted that although the process in FIGS. 13A and 13B has been described as an exemplary variation of the transfer process in FIGS. 11A and 11B, the process in FIGS. 13A and 13B may be carried out as an exemplary variation of the transfer process in FIG. 7.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-135279, filed Jul. 6, 2015 which is hereby incorporated by reference herein in its entirety.

What is claimed is:

1. An image processing apparatus connected to a printing apparatus including a storage unit and configured to transfer image data to the printing apparatus, the image processing apparatus comprising:

an obtaining unit configured to obtain, as a threshold size, a size of predetermined image data when a storage speed at which the predetermined image data is stored in the storage unit and a printing speed at which the predetermined image data stored in the storage unit is printed are the same;

an estimation unit configured to estimate a size of the image data to be stored in the storage unit in a compressed form;

a determination unit configured to, from a plurality of compression methods, select a compression method for use in compressing the image data based on the threshold size and the estimated size of the image data; and
a notification unit configured to notify the printing apparatus of the determined compression method.

2. The image processing apparatus according to claim 1, wherein the threshold size is stored in the storage unit of the printing apparatus in advance.

3. The image processing apparatus according to claim 1, further comprising a predicting unit configured to make a prediction based on the storage speed at which the predetermined image data of the threshold size is stored in the storage unit of the printing apparatus, a length of a recording sheet in a direction in which the recording sheet is conveyed in the printing apparatus when the predetermined image data is to be printed, and a conveying speed at which the recording sheet is conveyed in the printing apparatus.

4. The image processing apparatus according to claim 1,
wherein the storage unit of the printing apparatus comprises a first storage unit and a second storage unit,
wherein the image processing apparatus further includes an image transfer unit configured to transfer the image data to the printing apparatus,
wherein the obtaining unit is configured to obtain, as a threshold size, a smaller one of a size of the first storage unit and a size of the predetermined image data when a speed at which the predetermined image data is stored in the second storage unit and a speed at which the predetermined image data stored in the second storage unit is printed are the same,
wherein the estimation unit is configured to estimate a size of the image data to be compressed and stored successively in the first storage unit and the second storage unit, and
wherein the printing apparatus is configured to compress the image data after it has been transferred from the image processing apparatus based on the determined compression method and successively store the compressed image data in the first storage unit and the second storage unit.

5. The image processing apparatus according to claim 1,
wherein the plurality of compression methods include a first compression method and a second compression method, and
wherein a compression efficiency of the second compression method is higher than a compression efficiency of the first compression method.

6. The image processing apparatus according to claim 5,
wherein the threshold size and the estimated size of the image data are compared with each other,
wherein, in a case where the estimated size of the image data is equal to or smaller than the threshold size, the determination unit is configured to determine that the first compression method is to be used, and
wherein, in a case where the estimated size of the image data is larger than the threshold size, the determination unit is configured to determine that the second compression method is to be used.

7. The image processing apparatus according to claim 5,
wherein in a case where an instruction to give priority to a quality of a printed matter of the image data is received when the image data is to be printed, the determination unit is configured to determine that the first compression method is to be used, and
wherein, in a case where an instruction to give priority to a time period required to obtain a printed matter of the image data is received, the determination unit is configured to determine that the second compression method is to be used.

8. The image processing apparatus according to claim 5, wherein the first compression method is a lossless compression method, and the second compression method is a lossy compression method.

9. A printing system comprising an image processing apparatus connected to a printing apparatus including a storage unit, the image processing apparatus configured to transfer image data to the printing apparatus, and the printing apparatus configured to compress the transferred image data using one of a plurality of compression methods and store the compressed image data in the storage unit,
wherein the image processing apparatus comprises:
an obtaining unit configured to obtain, as a threshold size, a size of predetermined image data when a speed at which the predetermined image data is stored in the storage unit and a speed at which the predetermined image data stored in the storage unit is printed are the same;
an estimation unit configured to estimate a size of the image data to be stored in the storage unit in a compressed form; and
a determination unit configured to, from a plurality of compression methods, select a compression method for use in compressing the image data based on the threshold size and the estimated size of the image data, and
wherein the printing apparatus is configured to compress the image data after it has been transferred from the image processing apparatus based on the determined compression method and store the compressed image data in the storage unit.

10. A control method for an image processing apparatus connected to a printing apparatus including a storage unit and configured to transfer image data to the printing apparatus, the control method comprising:
an obtaining step of obtaining, as a threshold size, a size of predetermined image data when a storage speed at which the predetermined image data is stored in the storage unit and a printing speed at which the predetermined image data stored in the storage unit is printed are the same;
an estimation step of estimating a size of the image data to be stored in the storage unit in a compressed form;
a determination step of, from a plurality of compression methods, selecting a compression method for use in compressing the image data based on the threshold size and the estimated size of the image data; and
a notification step of notifying the printing apparatus of the determined compression method.

11. A control method for a printing system comprising an image processing apparatus connected to a printing apparatus including a storage unit, the image processing apparatus configured to transfer image data to the printing apparatus, and the printing apparatus configured to compress the transferred image data using one of a plurality of compression methods and store the compressed image data in the storage unit, the control method comprising:
an obtaining step of obtaining, as a threshold size, a size of predetermined image data when a storage speed at which the predetermined image data is stored in the storage unit and a printing speed at which the predetermined image data stored in the storage unit is printed are the same;

an estimation step of estimating a size of the image data to be stored in the storage unit in a compressed form;

a determination step of, from a plurality of compression methods, selecting a compression method for use in compressing the image data based on the threshold size and the estimated size of the image data; and a storage step of compressing the image data after it has been transferred from the image processing apparatus based on the determined compression method and storing the compressed image data in the storage unit.

12. A non-transitory computer-readable storage medium storing a program for causing a computer to execute a control method for an image processing apparatus connected to a printing apparatus including a storage unit and configured to transfer image data to the printing apparatus, the control method for the image processing apparatus comprising:

an obtaining step of obtaining, as a threshold size, a size of predetermined image data when a storage speed at which the predetermined image data is stored in the storage unit and a printing speed at which the predetermined image data stored in the storage unit is printed are the same;

an estimation step of estimating a size of the image data to be stored in the storage unit in a compressed form;

a determination step of, from a plurality of compression methods, selecting a compression method for use in compressing the image data based on the threshold size and the estimated size of the image data; and a notification step of notifying the printing apparatus of the determined compression method.

13. A non-transitory computer-readable storage medium storing a program for causing a computer to execute a control method for a printing system comprising an image processing apparatus connected to a printing apparatus including a storage unit, the image processing apparatus configured to transfer image data to the printing apparatus, and the printing apparatus configured to compress the transferred image data using one of a plurality of compression methods and store the compressed image data in the storage unit, the control method for the printing system comprising:

an obtaining step of obtaining, as a threshold size, a size of predetermined image data when a storage speed at which the predetermined image data is stored in the storage unit and a printing speed at which the predetermined image data stored in the storage unit is printed are the same;

an estimation step of estimating a size of the image data to be stored in the storage unit in a compressed form;

a determination step of, from a plurality of compression methods, selecting a compression method for use in compressing the image data based on the threshold size and the estimated size of the image data; and a storage step of compressing the image data after it has been transferred from the image processing apparatus based on the determined compression method and storing the compressed image data in the storage unit.

* * * * *